April 17, 1962 V. E. PETERSON 3,030,011

AXIS AND ELLIPSE COMPUTER

Filed Jan. 19, 1960 4 Sheets-Sheet 1

INVENTOR.
VERNON E. PETERSON
BY Walter G. Finch
ATTORNEY

VERNON E. PETERSON
INVENTOR.
BY Walter G. Finch
ATTORNEY

DETERMINING DEGREES OF ELLIPSES FOR NEW AXES LINES.

VERNON E. PETERSON
INVENTOR.
BY Walter G. Finch
ATTORNEY

April 17, 1962
V. E. PETERSON
3,030,011
AXIS AND ELLIPSE COMPUTER
Filed Jan. 19, 1960
4 Sheets-Sheet 4

VERNON E. PETERSON
INVENTOR.

BY Walter G. Finch
ATTORNEY

United States Patent Office 3,030,011
Patented Apr. 17, 1962

3,030,011

AXIS AND ELLIPSE COMPUTER

Vernon E. Peterson, Hopkins, Minn., assignor to Northern Ordnance, Incorporated, Fridley, Minn., a corporation of Minnesota Filed Jan. 19, 1960, Ser. No. 3,448
10 Claims. (Cl. 235—61)

This invention relates generally to drawing equipment, and, more particularly, it pertains to axis and ellipse computers for use in constructing axonometric type, three dimensional drawings.

In preparing axonometric drawings, considerable time and effort are necessary in establishing axes lines and elliptical surfaces for such drawings. In constructing such drawings, it is necessary to determine what degree ellipse to use when the foreshortened axis scale is known, or, when the degree ellipse is known, it is necessary to establish the proper foreshortened axis measurement for that ellipse or family of ellipses.

Technical artists who draw axonometric-type technical illustrations generally use an axonometric protractor which conforms to the axes angles and ellipses of that particular illustration in preparation. Axonometric protractors can be designed for isometric, dimetric or trimetric projections.

The axis and ellipse computers of the present invention can be used effectively with axonometric protractors. These axes and ellipse computers can be used to encompass the entire field of axonometric drawings and they are designed to be used with any type of axonometric protractor. These axis and ellipse computers cannot be used in the case where an isometric drawing using unity for the measurement scale on its axes is being prepared. Isometrics prepared by the orthographic projection method, or prepared by using an isometric scale, can use the axis and ellipse computer of the present invention.

It is an object of this invention, therefore, to provide novel axis and ellipse computers which can be utilized as a time-saving drawing aid for the technical illustrator.

Another object of this invention is to provide axis and ellipse computers which can be used effectively to determine the proper degree ellipse to use with an established axis.

Another object of this invention is to provide axis and ellipse computers for use in determining axes foreshortened measurement scales.

Another object of this invention is to provide axis and ellipse computers for use when beginning axonometric drawings.

Another object of this invention is to provide axis and ellipse computers for use in determining what degree ellipses are to be used on off-angle axes lines, that is, axes lines which are not parallel to the established axis lines of the axonometric drawings.

Another object of this invention is to provide axis and ellipse computers for use in determining the degree ellipse to be used on a compound angle axis line.

Another object of this invention is to provide axis and ellipse computers which can be used in connection with axonometric type protractors of various types for making axonometric drawings.

These and other objects and attendant advantages of this invention will be more readily apparent from the following detailed description and accompanying drawings in which.

Figures 1, 2, 3, 4, 5:
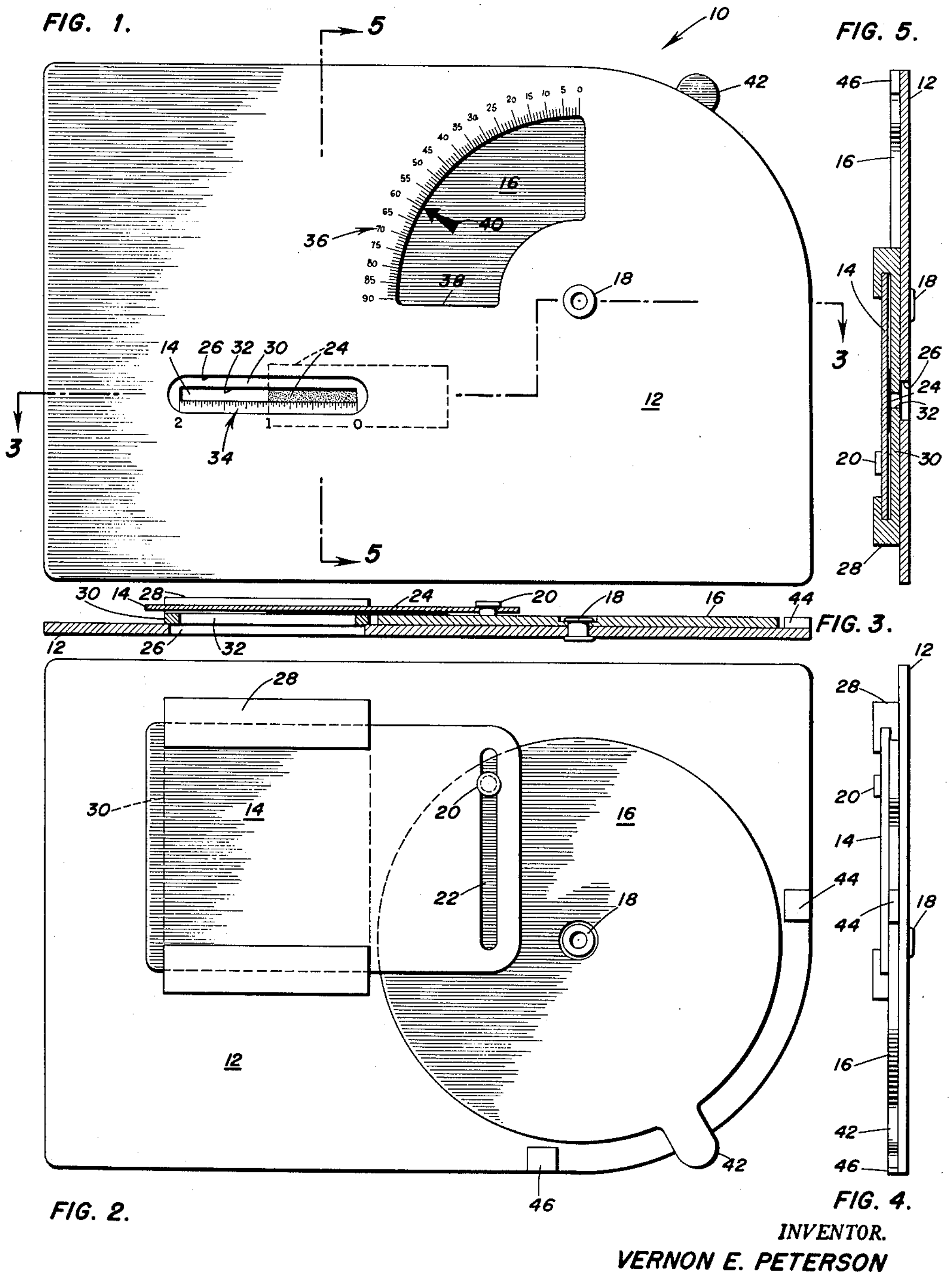
FIG. 1 is a front view of one embodiment of an axis and ellipse computer incorporating features of the present invention.
FIG. 2 is a rear view of the axis and ellipse computer of FIG. 1.
FIG. 3 is a cross-section of the axis and ellipse computer taken along line 3—3 of FIG. 1.
FIG. 4 is an end view of the axis and ellipse computer of FIG. 2.
FIG. 5 is a cross-section of the axis and ellipse computer taken along line 5—5 of FIG. 1.

Referring now to FIGS. 1 to 5, inclusive, of the drawings, there is illustrated an axis and ellipse computer 10. This computer 10 consists of three major parts, namely, a cover plate 12, an axis computer slide 14, and an ellipse indicator disc 16. The ellipse indicator disc 16 is rotatably mounted on a central pivot 18 which holds both the disc 16 and the cover plate 12 together and in surface to surface engagement.

A slide actuator pin 20 is secured to disc 16 near its periphery on an exact two (2) inch radius, and it rides within a close-fitting slot 22 located in the slide 14. Slot 22 is positioned transversely to the longer sides of slide 14 and parallel to the shorter sides thereof, as shown best in FIG. 2. A mechanical coupling of this type between disc 16 and slide 14 translates rotary motion to straight line motion.

The slide 14 is mounted in a pair of parallel spaced tracks 28 which are connected by a wall 30. The wall 30 is secured to the back of the cover plate 12 by suitable means, such as by cement or an equivalent arrangement.

An axis line 24 is imprinted in the front side of the slide 14, and it is exposed to view through a two (2) inch long narrow slot 32 cut in the wall 30 and through a wider slot 26 formed in the cover plate 12. A scale 34, of corresponding length, is provided adjacent to the two (2) inch long narrow slot 32, and it is also visible through the wider slot 26.

A fiducial line or pointer 40 is provided on the indicator disc 16, and it is viewed through an arcuate slot 38 formed in the plate 12. The pointer 40 indicates on a ninety (90) degree protractor scale 36 provided on the cover plate 12.

A finger tab 42 is formed integral with and projects from the periphery of the disc 16. This tab 42 is arranged to contact a pair of spaced stops 44 and 46 secured to the rear side of plate 12 to limit rotary movement of the disc 16 to ninety (90) degrees.

The exposed length of the imprinted axis line 24 varies according to the angle indicated on the protractor scale 36. It completely fills the two inch length narrow slot 32 when the pointer 40 is in the position corresponding to zero degrees. When the pointer 40 points to the ninety (90) degree position on the protractor scale 36, the imprinted axis line 24 is completely withdrawn from view in the slot 32.

It can be shown that the axis length indicated on the scale 34 is equal to twice the cosine of the angle indicated on the protractor scale 36. For example, as illustrated in FIG. 1, the cosine of the indicated sixty (60) degrees angle is 0.5. Twice this value, that is, $2 \times 0.5$, equals 1.0 which is indicated on the inch scale 34.

A modified computer 50, which occupies less space than computer 10 of FIGS. 1 to 5, is shown in FIGS. 6 to 10, inclusive. This computer 50 includes front and rear cover plates 52 and 54, an axis computer slide 56, and an ellipse indicator disc 60. The front cover plate 52 is provided with a recessed area 58 in which the axis computer slide 56 slides over part of the face of the ellipse indicator disc 60.

A recessed area 64 is provided in the rear cover plate 54 to receive the indicator disc 60. This disc 60 is pivotally secured to the rear cover plate 54 by a pivot boss 62. The boss 62 can be formed integral with the disc 60, and it engages in a mating aperture in the rear cover plate 54.

A plurality of spaced fasteners 66 are provided to secure the peripheral edges of the front and back cover plates 52 and 54 together.

A slide actuator boss 68 is accurately located on disc 60 at a two-inch radius from its center. A close-fitting slot 70 is provided in the slide 56 to receive the slide actuator boss 68. This slot 70 is arranged parallel to one pair of edges of slide 56 and transversely to the other pair of edges of slide 56.

The indicator disc 60 is calibrated along a portion of its edge periphery with a ninety (90) degree protractor scale 78. An arcuate aperture 80 is provided in the cover plate 52 to expose the protractor scale 78 to view. A fiducial mark or pointer 82 is placed on the front cover plate 52, as shown best in FIG. 6, and it is made to correspond to the protractor scale 78.

A finger tab 84 is formed integral with disc 60, and it extends outwardly from the disc 60. A pair of spaced stops 86 and 88 formed by the recessed rear cover plate 54 limit the rotation of disc 60 to the ninety (90) degrees of calibration.

Figure 6:
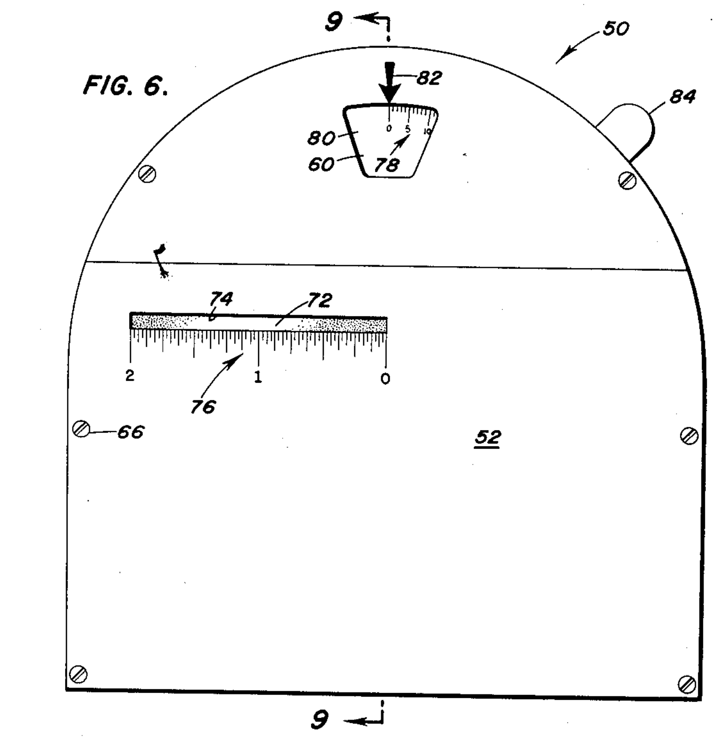
FIG. 6 is a front view of a second embodiment of an axis and ellipse computer incorporating features of the present invention.
Figure 8:
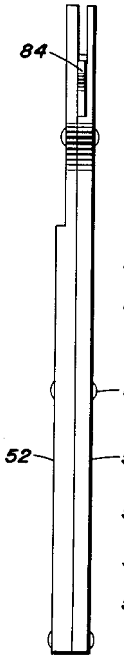
FIG. 8 is a side view of the axis and ellipse computer of FIG. 6.
Figure 9:
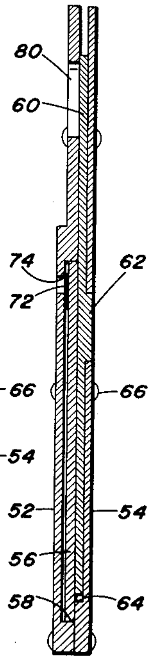
FIG. 9 is a cross-section of the axis and ellipse computer taken along line 9—9 of FIG. 6.
Figure 7:
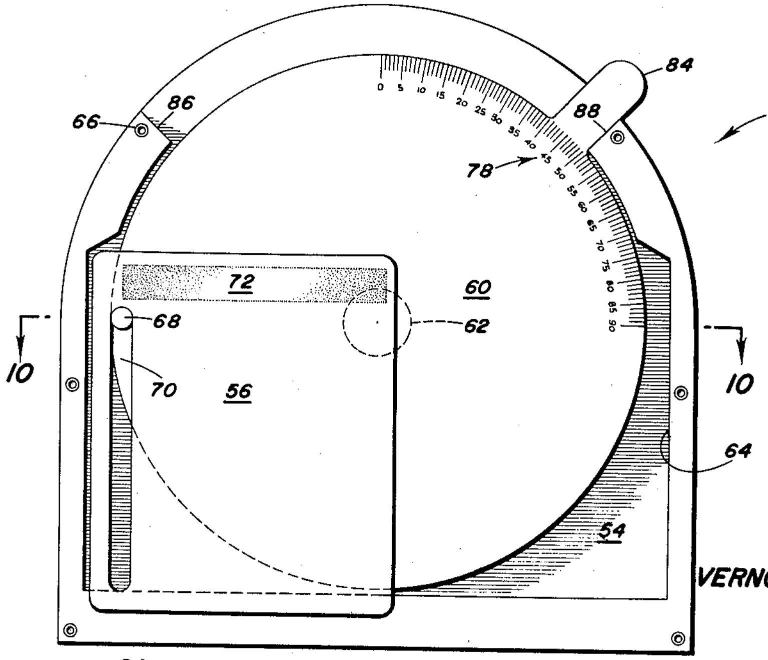
FIG. 7 is a front view of the axis and ellipse computer of FIG. 6, with parts removed to show elements on the interior thereof.
Figure 10:
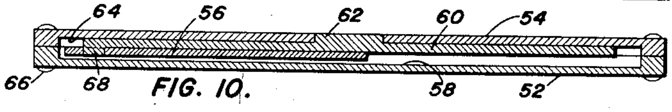
FIG. 10 is a cross-section of the axis and ellipse computer taken along line 10—10 of FIG. 7.

A two-inch axis line 72 is imprinted on the slide 56, and its full length is visible through a slot 74 provided in the front cover plate 52 when the indicated reading of the protractor scale 78 is in the zero degree position as illustrated in FIG. 6. A two-inch scale 76 is provided along the side of the slot 74 on the front cover plate 52 to measure the exposed length of the imprinted axis line 72.

The theory and principles applicable to the operational use of the computers 10 and 50 will now be discussed below in detail with erference to FIGS. 11 to 13, 14, 14A, 15A, and 15B.

Figure 15A:
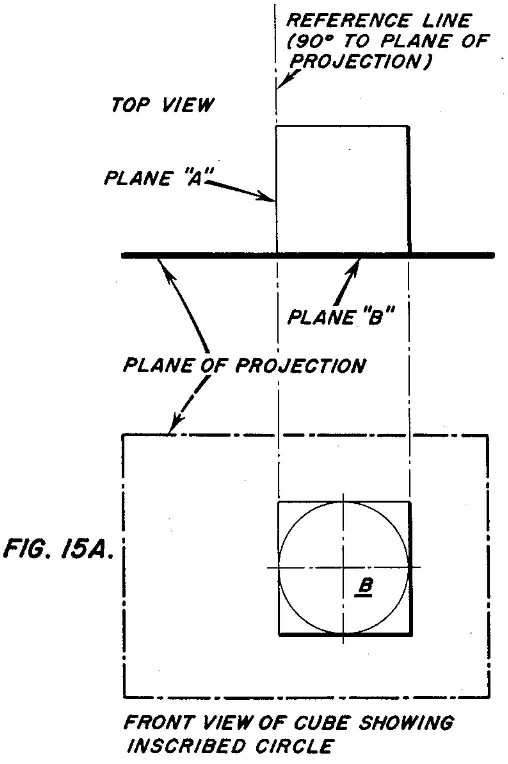
FIG. 15A illustrates top and front views of a cube illustrating the projection of a circle.

Referring first to the upper portion of FIG. 15A, the top view of a two-inch cube is shown with one surface of the cube, plane "B," located adjacent to the plane of projection. Circles are scribed on planes "A" and "B." The front view of the cube, as shown in the lower portion of FIG. 15A, shows the circle on plane "B," but the circle scribed on plane "A" is not visible.

Figure 15B:
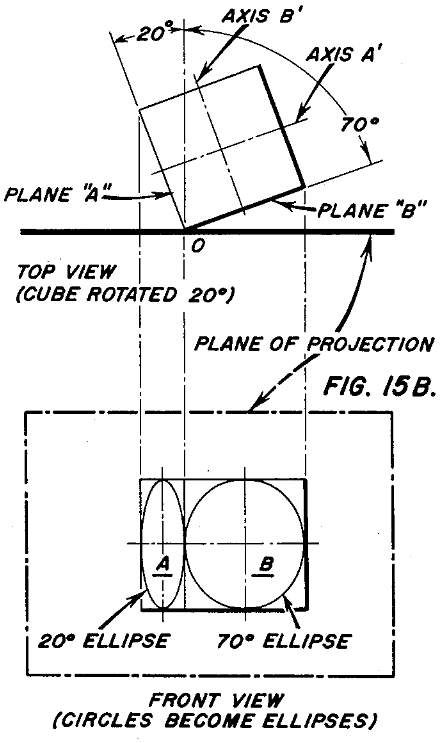
FIG. 15B illustrates top and front views of a cube rotated 20° and illustrating how circles become ellipses, respectively.

Referring now to the upper portion of FIG. 15B, the same cube is shown rotated twenty (20) degrees counterclockwise with the pivot point being indicated by the reference numeral 0. The front view of the cube, as shown in the lower portion of FIG. 15B, now illustrates the scribed circles on both planes "A" and "B" as ellipses.

The following fundamentals, which are useful in the construction of all axonometric type drawings, are discussed below in order to understand the operational use of the present invention.

The major diameters of the ellipses are always constant without regard to the angle of rotation of the cube. However, the minor diameters of the ellipses are always shorter than the major diameters and vary in length with the angle of rotation of the cube. Furthermore, the minor diameter of each ellipse is always coincident with its associated plane axis.

With regard to nomenclature, a plane is known by its degree of tilt towards the plane of projection. Likewise, a circle scribed on such plane becomes an ellipse which also is known by the degree of tilt towards the plane of projection. For example, in FIG. 15B, plane "A" is illustrated as being of twenty (20) degree tilt and the circle scribed thereon becomes a twenty (20) degree ellipse. Plane "B" of the complementary angle is then a seventy (70) degree plane or the circle scribed thereon a seventy (70) degree ellipse, with this plane being tilted seventy (70) degrees towards the plane of projection.

Thus, the minor diameter of one ellipse provides a foreshortened measurement scale which can be used for measuring on the axis for the other ellipse and vice versa. Referring to the top view of the two-inch cube of FIG. 15B, it will be noted that 2 times cosine 20 degrees is equal to the two (2) inch foreshortened scale ratio for all 20-degree ellipses.

Based upon the above principles, the two-inch hypotenuse was selected for the computers 10 and 50 together with the two-inch slide scales discussed in connection therewith.

Figure 11:
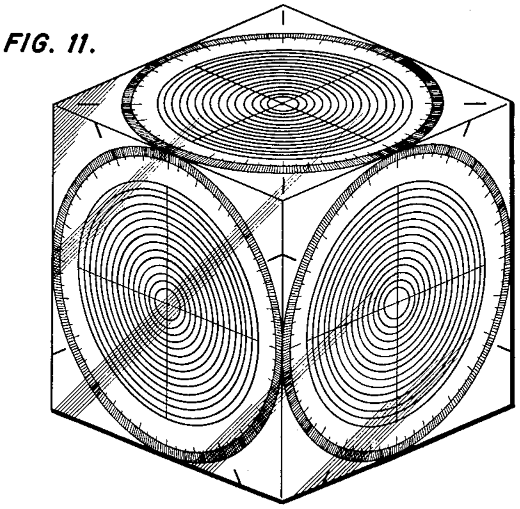
FIG. 11 is an axonometric drawing of a typical axonometric (dimetric type) protractor which has been constructed after axes angles, ellipses, and foreshortened scales have been determined.
Figure 12:
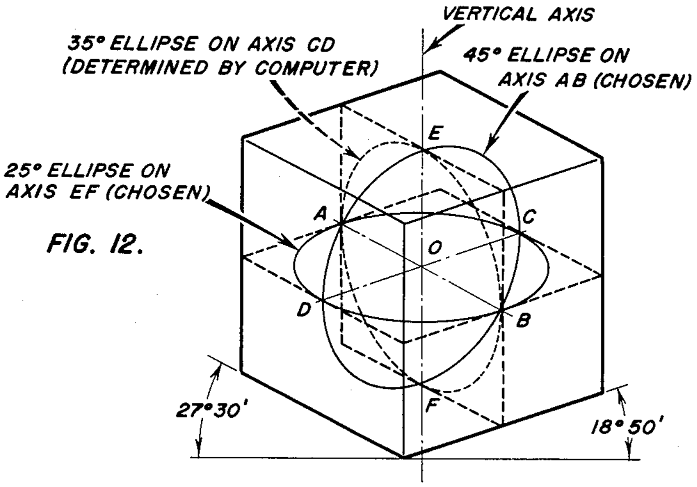
FIG. 12 is an axonometric (trimetric) drawing of a cube prepared as one example to show how, by means of the axis and ellipse computer, axes lines, foreshortened axes scales, and ellipses can be determined prior to starting construction of an actual axonometric drawing of a mechanism.

With reference to FIG. 12, as previously pointed out, this figure represents an axonometric (trimetric) drawing of a cube which is prepared as one example to show how the axes lines, foreshortened axes scales, and ellipses can be determined by the axis and ellipse computer 10 or 50 prior to starting construction of an axonometric drawing of a mechanism. After this cube drawing has been prepared, an axonomertic protractor (trimetric) should be constructed. This protractor must have the identical axes angles and ellipses of the cube. Only one two (2) inch ellipse for each surface of the protractor cube is necessary (not a multiple series as shown in FIG. 11) for use with the axis and ellipse computer 10 or 50.

In connection with FIG. 12, there is first erected a vertical axis. If the forward tilt selected for the ellipse is to be twenty-five (25) degrees, a two-inch twenty-five (25) degree ellipse is drawn with its minor axis and its center, which is indicated by the reference numeral 0, is placed at the desired center of the cube.

The degree of tilt of the ellipse toward the drawing plane for the right side is chosen, for example, as forty-five (45) degrees. The protractor scale 36 of computer 10, for example, is then set for forty-five (45) degrees to determine the length AB which will indicate on its slide scale 34. Half of this length indicated on the slide scale 34 is then struck off as a radius from the center 0. The intersections of the resulting arcs with the twenty-five (25) degree ellipse establishes the points A and B through which the right plane axis AB may now be drawn.

With its minor axis coinciding with this axis AB, a two-inch forty-five (45) degree ellipse is drawn on center 0. This forty-five (45) degree ellipse intersects the twenty-five (25) degree ellipse at points C and D, thus defining the left plane axis CD which can now be drawn.

The tilt angle of the ellipse corresponding to this left plane is obtained from the computer 10 by setting the length CD on the slide 34 and reading the corresponding angle of approximately 35° on the protractor scale 36. A two-inch thirty-five (35) degree ellipse is then drawn on center 0, with its minor axis coinciding with axis CD.

It is to be noted that the forty-five (45) degree ellipse intersects the first drawn vertical axis at E and F. These points E and F, as well as points A, B, C, and D, represent the center points of all of the surfaces of the cube, with lines AB, CD, and EF representing the lines for the axes.

By drawing straight lines, shown dotted in FIG. 12, parallel to the axis lines AB, CD, and EF through points A, B, C, D, E, and F, the corners of the cube can be established. By drawing lines parallel to the axis lines AB, CD, and EF through these corners, the drawing of the cube in FIG. 11 can readily be constructed.

Thus, ellipse degree templates for the axes have been determined, and can be measured angularly with a standard or adjustable protractor scale. Since the length of each axis line of the drawing of the cube represents two inches, a fore-shortened axis scale for each axis can be developed.

The illustrator now has all the required information at hand to construct an axonometric (in this case a trimetric) illustration from engineering drawings.

Ellipse degrees are easily determined for new off-angle axes lines which often develop within the axonometric drawing or drawings being prepared. The new angles for these lines are first obtained from the engineering drawing or drawings and then, by means of an axonometric protractor (similar to that of FIG. 11 but whose axes angles and ellipses conform to axes angles and ellipses of the illustration in process) are established on the axonometric drawing.

If the off-angle axes lines develop on any of the initially established surfaces of the axonometric drawing, or on planes parallel to these surfaces, the new ellipse sizes and new axes scales can be directly determined by the computer 10 or 50.

Figure 13:
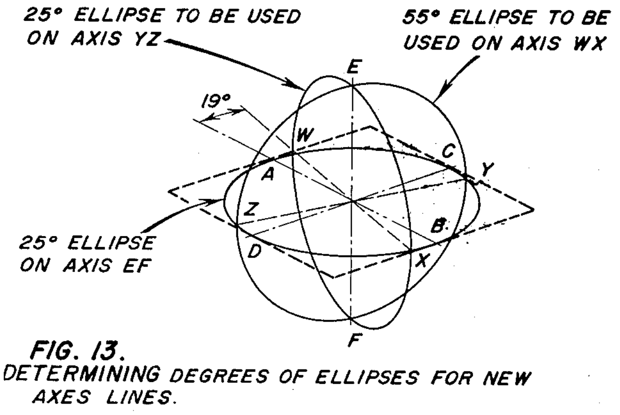
FIG. 13 is an axonometric schematic which is used to illustrate how the correct degree ellipse can be determined for each new axis by means of the axis and ellipse computer.

Referring now to the twenty-five (25) degree plane of the axonometric schematic of FIG. 13 (the design of the computer 10 or 50 is based on the two-inch cube), let it be assumed that the new off-angle line WX is nineteen (19) degrees clockwise from the established axis AB. Then the other new axis line YZ would be nineteen (19) degrees from the established axis CD, or ninety (90) degrees clockwise from new axis line WX.

With dividers, the length of WX is measured. The indicator lever is then adjusted until the axis line of the computer 10 is equal in length to the measurement taken by the dividers. The pointer 40 will indicate that the degree ellipse to use on axis WX will be fifty-five (55) degrees. The foreshortened per unit inch measurement on axis WX will be either one-half of the distance of WX at its intersections with the twenty-five (25) degree ellipse, or one-half of the length of the computer axis line.

The same procedure is used for determining the degree ellipse and the foreshortened per unit inch measurement for axis YZ as was used for axis WX. It is to be noted that for axis YZ, the associated ellipse is approximately twenty-five (25) degrees.

Ellipses for compound axes angles can be determined with the aid of the computer 10 or 50. First, however, the new axes must be graphically established. Let it be assumed, for example, that in addition to the axis rotation of nineteen (19) degrees on the twenty-five (25) degree plane of FIG. 13, the vertical axis EF is rotated twenty-three (23) degrees clockwise in the elliptical plane of axis YZ. Then axis WX, too, would be rotated twenty-three (23) degrees. The problem is to determine the locations of the new axes as well as the correct degrees of ellipses for these axes.

Figures 14A, 14B:
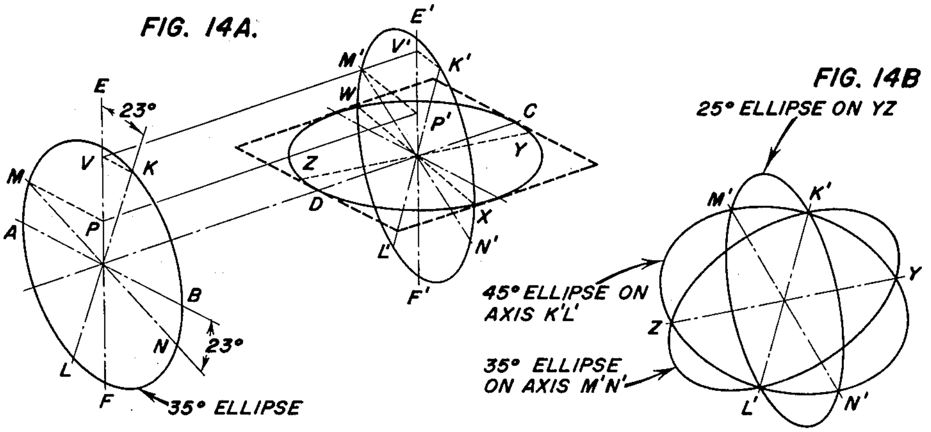
FIG. 14A is an axonometric schematic illustrating the step-by-step procedure for determining the correct degree ellipses for compound angle axes and foreshortened axes scales with the aid of the axis and ellipse computer.
FIG. 14B is a axonometric schematic of constructed ellipses prepared in accordance with the schematic of FIG. 14A.

Referring now to FIG. 14A, the axis line CD is extended and a thirty-five (35) degree ellipse is scribed on it as was initially determined when the cube of FIG. 12 was drawn. From the axonometric protractor, which has been prepared in accord with the axes angles and ellipses of FIG. 12, transfer the twenty-three (23) degree angular measurement from its thirty-five (35) degree protractor plane to the thirty-five (35) degree elliptical plane of FIG. 14A. At this twenty-three (23) degree angular measurement from lines AB and EF, the points K, L, M, and N are established.

By drawing lines from these points K, L, M, and N through the center of the ellipse, lines KL and MN are established on the elliptical plane of axis CD.

Now it is necessary to transfer these lines to the elliptical surface of axis YZ, as shown by the right side of FIG. 14A. From points K and M, at the left of FIG. 14A, lines are drawn parallel to AB to intersect axis EF at points V and P. These points are then projected to axis E′F′ at V′ and P′. The lines of projection must be parallel to CD.

From points V′ and P′, lines are drawn parallel to WX to intersect the ellipse of axis YZ at points K′ and M′. Then the lines from points K′ and M′ passing through the center of the ellipse becomes the new axes lines M′N′ and K′L′. The axis line of the computer 10 or 50 is then adjusted until it is equal in length to the measurement of axis K′L′. The indicator pointer 40 of computer 10, for example, will show that a forty-five (45) degree ellipse is required for that axis. The same procedure for axis M′N′ will indicate that a thirty-five (35) degree ellipse is required, as shown in FIG. 14B.

Obviously, many other modifications and variations of the two embodiments of the present invention are possible in light of the above teachings. It is, therefore, to be understood that within the scope of the appended claims the invention may be practiced otherwise than as specifically described.

What is claimed is:

1. A computer, comprising, a base having a pivot on one side thereof, said base having an arcuate slot provided therein and located on a radius of said pivot and an elongated slot provided therein spaced from said arcuate slot and pivot, a disc rotatably mounted on said pivot for angular movement behind said arcuate slot of said base, one of said base and disc having an angular scale thereon and the other of said disc and base having a fiducial mark both adjacent said arcuate slot, said fiducial mark cooperating with said angular scale for indicating the angular movement of said disc, a pair of spaced slide tracks on said one side of said base position parallel to said elongated slot, a slide mounted on said spaced tracks for reciprocating movement therealong and having a fiducial indicator on its face visible through said elongated slot of said base, said slide having a traverse slot formed therein located perpendicular to the direction of movement of said slide along said tracks, and means on said disc positioned at a radial distance from said pivot of said base corresponding to the length of said elongated slot of said base and engageable in said traverse slot of said slide for mechanically coupling said disc to said slide for converting said angular movement of said disc into linear movement of said slide, with the linear distance moved by said slide being a trigonometric function of the angle of movement of said disc as indicated by the movement of said fiducial indicator and its slide visible through said elongated slot in said base.

2. A computer as recited in claim 1, and additionally a linear scale on said other face of said base adjacent said elongated slot and cooperating with said fiducial indicator for measuring the linear distance moved by said slide upon predetermined angular rotation of said disc.

3. A computer as recited in claim 2, wherein said fiducial indicator consists of an imprinted line.

4. A computer as recited in claim 1, and additionally means for limiting the angular rotation of said disc in a forward as well as a reverse direction.

5. A computer as recited in claim 1, and additionally tab means secured to said disc to facilitate the angular rotation thereof.

6. A computer as recited in claim 1, wherein said base has a recess provided therein on said one side thereof to receive said disc and slide.

7. An axis and ellipse computer, comprising, a base having a pivot on one side thereof, said base having an arcuate slot provided therein and located on a radius of said pivot and an elongated slot provided therein and spaced from said arcuate slot and said pivot, a disc rotatably mounted on said pivot for angular movement behind said arcuate slot of said base, one of said base and disc having a fiducial mark thereon and the other of said disc and base having a protractor scale thereon adjacent said arcuate slot for indicating the angular movement of said disc relative to said fiducial mark, a pair of spaced slide tracks on said one side of said base positioned parallel to said elongated slot, a slide mounted on said spaced tracks for reciprocating movement therealong and having a fiducial indicator on its face visible through said elongated slot, a linear scale on said other face of said base adjacent said elongated slot for indicating the distance moved by said slide, said slide having a traverse slot formed therein located perpendicular to the direction of movement of said slide, and pin means on said disc positioned at a radial distance from said pivot of said base corresponding to the length of said linear scale of said base and engageable in said traverse slot of said slide for mechanically coupling said disc to said slide for converting said angular movement of said disc into linear movement of said slide, with the linear distance moved by said slide being a trigonometric function of the angle of movement of said disc as indicated by said fiducial indicator on said slide visible through said elongated slot in said base and measured on said linear scale.

8. A computer as recited in claim 7, and additionally means for limiting the angular movement of said disc in a forward as well as a reverse direction.

9. A computer as recited in claim 7, and additionally tab means secured to said disc to facilitate movement thereof.

10. A computer as recited in claim 7, wherein said base has a recess area provided therein on said one side thereof to receive said disc and slide.

References Cited in the file of this patent

UNITED STATES PATENTS 2,449,342 Tardif ---------------- Sept. 14, 1948

OTHER REFERENCES

Stromback and Reid: "Mechanical Computing Mechanisms II," p. 120, September 1949, Product Engineering.